(12) United States Patent
Aou et al.

(10) Patent No.: US 11,518,842 B2
(45) Date of Patent: Dec. 6, 2022

(54) FLEXIBLE POLYURETHANE FOAM HAVING PROLONGED RECOVERY TIME

(71) Applicant: Dow Global Technologies LLC, Midland, MI (US)

(72) Inventors: Kaoru Aou, Lake Jackson, TX (US); Qinghao Meng, Angleton, TX (US); Daniel L. Dermody, Midland, MI (US); Hari Katepalli, Midland, MI (US); William J. Harris, Lake Jackson, TX (US); An Kaga, Lake Jackson, TX (US); Kathleen Barnes, Midland, MI (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/980,018

(22) PCT Filed: Mar. 8, 2019

(86) PCT No.: PCT/US2019/021425
§ 371 (c)(1),
(2) Date: Sep. 11, 2020

(87) PCT Pub. No.: WO2019/177901
PCT Pub. Date: Sep. 19, 2019

(65) Prior Publication Data
US 2021/0009747 A1 Jan. 14, 2021

Related U.S. Application Data

(60) Provisional application No. 62/642,355, filed on Mar. 13, 2018.

(51) Int. Cl.
| | | |
|---|---|---|
| C08G 18/16 | (2006.01) |
| C08G 18/18 | (2006.01) |
| C08G 18/20 | (2006.01) |
| C08G 18/24 | (2006.01) |
| C08G 18/28 | (2006.01) |
| C08G 18/48 | (2006.01) |
| C08G 18/64 | (2006.01) |
| C08G 18/76 | (2006.01) |
| C08J 9/12 | (2006.01) |
| C08K 3/36 | (2006.01) |
| C08K 9/06 | (2006.01) |
| C08L 83/04 | (2006.01) |
| C08L 93/04 | (2006.01) |
| C08K 3/04 | (2006.01) |

(52) U.S. Cl.
CPC ....... *C08G 18/165* (2013.01); *C08G 18/1833* (2013.01); *C08G 18/2027* (2013.01); *C08G 18/244* (2013.01); *C08G 18/283* (2013.01); *C08G 18/485* (2013.01); *C08G 18/6492* (2013.01); *C08G 18/7621* (2013.01); *C08J 9/125* (2013.01); *C08K 3/04* (2013.01); *C08K 3/36* (2013.01); *C08K 9/06* (2013.01); *C08L 83/04* (2013.01); *C08L 93/04* (2013.01); *C08G 2110/005* (2021.01); *C08G 2110/0008* (2021.01); *C08G 2110/0083* (2021.01); *C08J 2203/10* (2013.01); *C08J 2205/06* (2013.01); *C08J 2375/08* (2013.01); *C08K 2201/006* (2013.01)

(58) Field of Classification Search
CPC .......................... C08G 18/485; C08G 18/6492
See application file for complete search history.

(56) References Cited

U.S. PATENT DOCUMENTS

| | | | | |
|---|---|---|---|---|
| 4,160,076 A * | 7/1979 | Guthrie | .................. | C08J 9/0061 521/905 |
| 4,327,194 A * | 4/1982 | Chandalia | .......... | C08G 18/4841 521/122 |
| 4,595,610 A | 6/1986 | Fey | | |
| 4,725,627 A | 2/1988 | Aranson | | |
| 2004/0122118 A1* | 6/2004 | Tanaka | .................... | C08G 18/61 521/50 |
| 2007/0238800 A1* | 10/2007 | Neal | ..................... | C08G 18/632 521/174 |
| 2010/0267854 A1* | 10/2010 | Cremer | ................ | C08G 18/089 521/154 |
| 2021/0002411 A1* | 1/2021 | Meng | .................... | C08G 18/283 |
| 2021/0061941 A1* | 3/2021 | Meng | ..................... | C08L 93/04 |

FOREIGN PATENT DOCUMENTS

| | | |
|---|---|---|
| WO | 98/52986 A | 11/1998 |
| WO | 2017/210439 A | 12/2017 |

* cited by examiner

*Primary Examiner* — Melissa A Rioja

(57) ABSTRACT

Recovery times and/or airflow of flexible polyurethane foam is increased by including certain tackifiers in the foam formulation. The tackifiers are formed into an emulsion that includes a polyether containing oxyethylene groups, a nonionic surfactant and certain fumed silica, carbon black or talc particles.

9 Claims, 1 Drawing Sheet

← 100 microns →

← 100 microns →

FLEXIBLE POLYURETHANE FOAM HAVING PROLONGED RECOVERY TIME

This invention relates to flexible polyurethane foam characterized in having a prolonged recovery time, and to methods for making such a foam.

Slow-recovering flexible polyurethane foam represents a fast-growing segment of the polyurethane foam industry. Their low resiliency and slow recovery from compression distinguish these foams from HR (high resiliency) and "conventional" flexible polyurethane foams, which have much greater resiliency and which recover almost immediately after compression. These slow-recovering foams are sometimes marketed as "memory" foam. They are being used increasingly in pillows and mattresses, where the viscoelastic character of the foam imparts a feel that consumers perceive as highly comfortable. They are also used in acoustic applications to reduce NVH (noise, vibration and harshness) and in various applications such as earplugs where slow recovery is advantageous.

The slow recovery of these foams is often attributable at least in part to their glass transition temperature, which often is close to the use temperature, typically in the range of about 20 to 35° C. For example, slow-recovering foam for bedding applications (mattresses, pillows) often has a glass transition temperature that ranges from about room temperature to the human torso body temperature.

These foams exhibit a large change of properties when cooled from above to below their glass transition temperature, or vice versa. Foams that have glass transition temperatures near room temperature tend to have highly variable properties depending on the ambient temperature at any given time. For example, the hardness of the foam (and therefore its perceived comfort) can change significantly with increases and decreases in ambient temperature that commonly occur with the change of seasons, the time of day or even the operation of an HVAC system within a room or building. The somewhat high glass transition temperature also creates certain disadvantages from a manufacturing perspective. Foams having a glass transition temperature of 20° C. or more often are stored at lower temperatures at which they become harder and more difficult to cut and fabricate.

At least two other approaches to increasing recovery time of polyurethane foam have been suggested. Long recovery times can be achieved even in lower $T_g$ foams if the cell windows of the foam are mostly closed. The closed cell windows inhibit the flow of air in and out of the foam as it is compressed and subsequently decompresses. This pneumatic effect prolongs the recovery time. The problem with this approach is that foams that do not breathe easily and for that reason do not dissipate moisture vapor as quickly, meaning that when such foams are used in mattresses, the body cannot regulate body skin temperature as easily, leading to discomfort.

Another suggested approach to producing foam having a long recovery foam is to apply a tacky coating to the internal surfaces of the foam. This can be done by applying the coating to the finished foam. For example, WO 2017/210439 describes applying an aqueous polymer emulsion that contains an encapsulated phase change material to a previously formed polyurethane foam. This approach requires additional manufacturing steps, including an energy- and/or time-intensive drying step to remove residual water from the applied emulsion.

A potentially simpler and less expensive way to apply the tacky coating is to incorporate the coating material into the foam formulation. This has proven to be a difficult problem because the tacky material tends to be incompatible with other components of the foam formulation, and in addition tends to be highly viscous. Each of those attributes makes foam processing difficult, especially on a large scale. U.S. Pat. No. 4,625,627, for example, describes method for making squeezable foam toys that have dimensional memory. An aqueous emulsion of a vinyl or acrylic polymer is incorporated into the foam formulation. This method is plagued with difficulties. It is limited to making small foam objects. An organic cosolvent may be needed, which must be removed from the product to avoid odor and solvent exposure issues. Large amounts of water are needed in the formulation to carry in the vinyl or acrylic polymer into the foam formulation. A prepolymer process is needed because of the large amounts of water used. The prepolymer process is more expensive because of the need to separately manufacture the prepolymer.

There is a desire for an efficient and effective method to produce a flexible polyurethane foam that has a prolonged recovery time. The method should be amenable to large-scale foam production.

This invention is in one aspect an emulsion comprising i) at least one tackifier, ii) at least one polyether polyol having an oxyethylene content of at least 50% by weight, iii) at least one nonionic surfactant having a hydrophilic-lipophilic balance of 12 to 19, and iv) at least one hydrophobically-modified fumed silica, carbon black, talc, or a mixture of any two or more thereof, wherein the emulsion contains 0.1 to 5 weight percent of component iv) and no more than 10 weight percent of water, based on the total weight of the emulsion, and the weight ratio of component ii) to component i) is 0.5 to 10.

The invention is in a second aspect a formulated polyol composition comprising:

i) at least one tackifier;
ii) at least one polyether polyol having an oxyethylene content of at least 50% by weight;
iii) at least one nonionic surfactant having a hydrophilic-lipophilic balance of 12 to 19;
iv) at least one hydrophobically-modified fumed silica, carbon black, talc, or a mixture of any two or more thereof;
v) 0.25 to 5 weight percent water, based on the total weight of the polyol composition; and
vi) at least one urethane catalyst; and
vii) at least one foam-stabilizing surfactant, wherein the polyol composition contains 5 to 25 weight percent of component i) and 0.1 to 2.5 weight percent of component iv), based on the total weight of the polyol composition, and the weight ratio of component ii) to component i) is 0.5 to 10.

The invention is in a third aspect a method of making a flexible polyurethane foam, comprising I. forming a reaction mixture, at an isocyanate index of 60 to 125, the reaction mixture comprising:

i) at least one tackifier;
ii) at least one polyether polyol having an oxyethylene content of at least 50% by weight;
iii) at least one nonionic surfactant having a hydrophilic-lipophilic balance of 12 to 19;
iv) at least one hydrophobically-modified fumed silica, carbon black, talc, or a mixture of any two or more thereof;
v) 0.25 to 5 weight percent water, based on the total weight of all components of the reaction mixture except the polyisocyanate;
vi) at least one urethane catalyst;
vii) at least one foam-stabilizing surfactant, and viii) at least one organic polyisocyanate wherein the reaction mixture contains 5 to 25 weight percent of component i) and 0.1 to 2.5 weight percent of component iv) based on the total weight of all components except the organic polyisocyanate(s), and the weight ratio of component ii) to component i) is 0.5 to 10; and II) reacting the reaction mixture to form the flexible polyurethane foam.

In a fourth aspect, this invention is a flexible polyurethane foam made in the foregoing process.

The addition of the tackifier has been found to increase recovery times of the foam while preserving or even increasing high airflows.

The foams therefore have a very desirable set of haptic properties that make them excellent candidates for bedding and other comfort applications in which the foam becomes exposed to the body heat of and/or water vapor evaporating from the body of a human user. The foam or an article containing the foam may in such applications support at least a portion of the weight of a human user. In addition, the foam formulation containing the tackifier is easily processable using industrial-scale foam production equipment as is commonly used to produce high volumes of slabstock foam and molded flexible foam.

Emulsion

Figure 1:
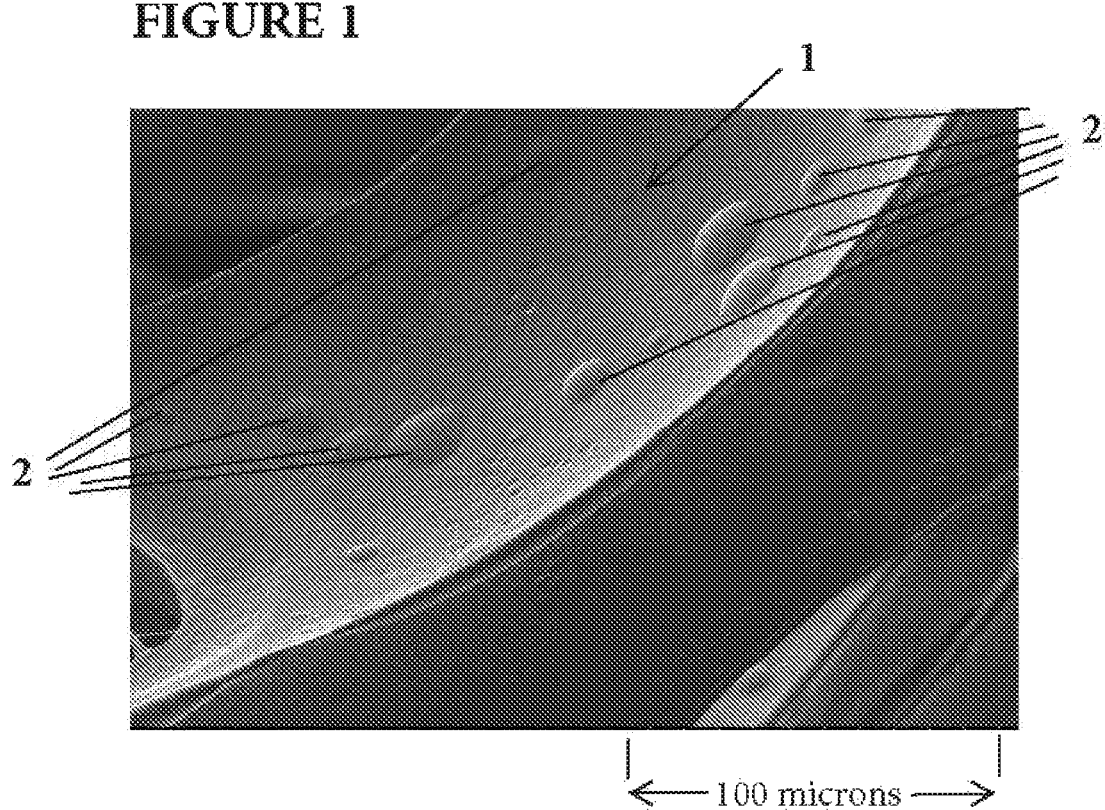
FIG. 1 is a scanning electron micrograph of a foam made in accordance with Example 1.

The tackifier (component i) of the emulsion) is a room temperature liquid or solid. It has a viscosity of at least 5,000 centipoise at 25° C. (if a liquid at such temperature), preferably at least 10,000 cps or at least 25,000 cps. The viscosity of the tackifier is conveniently measured using a rheometer such as a Brookfield (Brookfield Engineering Laboratories, Inc.) or AR 2000 (TA Instruments). It has a glass transition temperature of at most 20° C., preferably at most 0° C. or at most −10° C. The glass transition temperature of the tackifier is as measured by dynamic mechanical analysis, and is taken as the temperature of the peak tan delta value. In some embodiments, the tackifier is not reactive with isocyanate groups, hydroxyl groups, amino groups or water under the conditions of the foam-forming reaction. The tackifier has a boiling temperature in excess of 100° C. at one atmosphere pressure.

If a room temperature solid, the tackifier also preferably has a cup and ball softening temperature of at most 35° C.

The tackifier also preferably is incompatible or at least partially incompatible with component ii) of the formulated polyol composition. Compatibility with component ii) is evaluated by mixing the tackifier with the polyol or mixture of polyols for 30 seconds using a high-speed laboratory mixer at 1,000 rpm (revolutions per minute), at the relative proportions to be used in making foam, and then allowing the mixture to come to rest. The mixer has a pitch blade turbine impeller with a diameter of 80 mm. The cup diameter is 100 mm, its capacity is 1000 mL and the total amount of material (polyol or mixture plus tackifier) in the container is 300 grams. The formation of a visually homogeneous mixture indicates the tackifier is compatible with component ii). Conversely, the formation of a heterogeneous mixture in which the tackifier forms a separate phase (which may be a disperse phase such as droplets or particles, or even a separate layer due to gross phase segregation) indicates that the tackifier is at least partially incompatible with component ii). A cloudy mixture containing dispersed droplets or particles visible via microscopy also evidences at least partial incompatibility with the polyol or mixture of polyols.

The tackifier may be, for example, a rosin, a hydrogenated and/or esterified rosin, a polyterpene, a C5 aliphatic resin, a C9 aromatic resin, a C5/C9 copolymer resin, a hydrogenated C5 or C9 resin, a polymer or copolymer of butene (including isobutylene) (such as INDOPOL® H-50, H-100, H-300, H-1200 and H-1500 polybutenes from INEOS), an epoxy resin, a styrene/conjugated diene copolymer such as styrene/butadiene copolymer and styrene isoprene copolymer, an ethylene-acrylic acid copolymer, an ethylene-higher alpha-olefin copolymer (including ethylene-propylene and ethylene-octene copolymers) having a density of less than 0.900 g/cc a silicone oil, a cellulosic such as xanthan gum, ethyl cellulose, hydroxylpropyl methyl cellulose and carboxylmethyl cellulose, cationic polyacrylamide, para-t-octyl phenol formaldehyde resin, a polyester having a number average molecular weight of 400 to 2000 including, for example, those described in WO 2001/060939, a urethane acrylate oligomer, a room temperature liquid ethylene-propylene-diene resin such as Trilene® 65 and Trilene® 67 elastomers from Lion Elastomers, and the like.

"Rosin" refers to the resinous constituent of oleoresin exuded by various plant species, mainly conifers such as pine, after removal of essential oils. "Rosin" includes, for example, wood rosin, gum rosin and tall oil rosin. The main components or rosin are 20-carbon, tricyclic, aliphatic carboxylic acids that have two or more carbon-carbon double bonds, including one or more of abietic acid, neoabietic acid, palustric acid, levopimaric acid, dihydroabietic acid, pimaric acid, isopimaric acid and sandaracopimaric acids.

A hydrogenated rosin is a rosin as just described in which one or more of the carbon-carbon double bonds of at least some of the constituent carboxylic acids have been hydrogenated.

An esterified rosin is a rosin as described above in which some or all of the carboxylic acid groups of the constituent carboxylic acids have been converted to ester groups, typically by reaction with an alcohol compound that has one or more alcohol groups (provided the esterified rosin is not reactive with any of components A), B) and C)). The ester may be, for example, an alkanol ester such as a methyl, ethyl, isopropyl, n-propyl, n-butyl, isobutyl or t-butyl ester. The ester may be a polyester ester of such carboxylic acids and a polyol having up to 6 carbon atoms such as glycerin, ethylene glycol, diethylene glycol, triethylene glycol, propylene glycol, 1,4-butane diol, 1,6-hexane diol, trimethylolpropane, trimethylolethane and the like.

A polyterpene may be a polymer of one or more of α-pinene, β-pinene and d-limonene.

C5 aliphatic resins are produced by polymerizing C5 piperylene. "C5 piperylene" refers to a mixed stream of unsaturated aliphatic 5-carbon atom compounds obtained from a naphtha cracker. C5 piperylene typically contains one or more of cis/trans 1,3-pentadienes, 2-methyl-2-butene, cyclopentane, cyclopentadiene, and dicyclopentadiene.

C9 aromatic resins are produced by polymerizing C9 aromatic hydrocarbons. "C9 aromatic hydrocarbons" refers to a mixed stream of aromatic compounds that have aliphatic carbon-carbon double bonds and 8-10 carbon atoms, such as indene, methylindenes, styrene, alpha-methyl styrene, vinyl toluenes, that are obtained from a naphtha cracker. The C9 aromatic hydrocarbons may contain a proportion of other aliphatic C9 compounds.

C5/C9 copolymer resins are copolymers of C5 piperylene and C9 aromatic hydrocarbons.

Examples of polyester tackifiers include diethylene glycol/phthalic anhydride polyesters having molecular weights of 400 to 2000 and hexamethylene glycol/phthalic anhydride polyesters having molecular weights of 400 to 2000. The polyester tackifiers may have viscosities in excess of 5000 cps at 140° C. Examples of such polyester tackifiers include those sold by Stepan Chemical Company as Stepanpol® PD56 and Stepanpol® PH 56.

Examples of ethylene-higher alpha olefin copolymers having densities below 0.900 g/cm$^3$ include AFFINITY® GA 1000R POE, GA1900 POE and GA 1950 POE from The Dow Chemical Company.

Materials such as mineral oil can be present in the tackifier to decrease its softening temperature into the aforementioned range. Solvents such as at least one monoalcohol also may be used to decrease softening temperature and viscosity of the tackifier. The monoalcohol is characterized in having at least 4 carbon atoms, a molecular weight of up to 300 g/mol and a viscosity of up to 500 cps at 25° C. as measured using a cone-and-plate viscometer. The monoalcohol preferably contains at least 5 carbon atoms and has a molecular weight of up to 200.

The tackifier may be provided in the form of a blend with an organic polymer having a ring and ball softening temperature of greater than 50° C. Such a blend may contain 2 to 99% of the tackifier.

The emulsion preferably contains no more than 5 weight percent, more preferably no more than 2 weight percent or no more than 1 weight percent, of compounds having a boiling temperature (at 1 atmosphere pressure) of 100° C. or lower.

Component ii) of the emulsion is a polyether polyol having an oxyethylene content of at least 50% by weight. Its oxyethylene content may be at least 60%, at least 70%, at least 75%, at least 80%, at least 85% or at least 90% and may be up to 100%. The polyether polyol component ii) nominally may contain, for example, at least 2 hydroxyl groups per molecule and up to 8, up to 6, up to 4 or up to 3 hydroxyl groups per molecule. The polyether polyol component ii) may have a number average hydroxyl equivalent weight of at least 150, at least 250, at least 400, at least 500, at least 750, at least 900, at least 1000 or at least 1200 and, for example, up to 3000, up to 2500, up to 2000 or up to 1750.

Component iii) of the emulsion is at least one nonionic surfactant having a hydrophilic-lipophilic balance of 12 to 19. Hydrophilic-lipophilic balance (HLB) is calculated as 20×(A/B), where A represents the weight of the hydrophilic portion of the surfactant molecule and B represents its total weight. The nonionic surfactant preferably is soluble in or self-dispersing in the polyether polyol component ii). Examples of suitable nonionic surfactants include block copolymers of ethylene oxide and a higher alkylene oxide such as propylene oxide, 1,2-butylene oxide, tetrahydrofuran and the like and ethoxylated hydrocarbons in which the hydrocarbon portion includes a linear, branched, aliphatic, cycloaliphatic and/or aromatic group having at least 6, preferably at least 8, at least 10 or at least 12 carbon atoms. Specific examples include diblock copolymers of ethylene oxide and propylene oxide; diblock copolymers of ethylene oxide and 1,2- and/or 2,3-butylene oxide, diblock copolymers of ethylene oxide and tetrahydrofuran, ethoxylated $C_6$-$C_{48}$ alkanols (which alkanols may be linear or branched, ethoxylated alkylphenols having 1-48, especially 1-24, carbon atoms in the alkyl group, ethoxylated $C_6$-$C_{48}$ linear or branched mono- or polyunsaturated aliphatic alcohols and the like, wherein in each case the poly(oxyethylene) portion constitutes 60% to 95% of the total weight of the surfactant molecule.

Component iv) of the emulsion is at least one hydrophobically-modified fumed silica, carbon black, talc, or a mixture of any two or more thereof.

Fumed silica is hydrophobically modified by reaction at its surface with one or more hydrocarbon, halogen-substituted hydrocarbons, siloxanes and/or silanes to render the surface less hydrophilic and, conversely, more hydrophobic.

The hydrophobically-modified fumed silica may have a surface area of at least 50, at least 80 or at least 90 m$^2$/g and, for example, up to 300, up to 250 or up to 225 m$^2$/g as measured by nitrogen absorption methods. Examples of suitable hydrophobically-modified fumed silica products include Aerosil® R972, Aerosil® R974, Aerosil® R976, Aerosil® R104, Aerosil® R 106, Aerosil® R 202, Aerosil® R208, Aerosil® R805, Aerosil® R812, Aerosil® R 816, Aerosil® R7200, Aerosil® R8200, Aerosil® R9200 and Aerosil® R711, all available from Evonik Industries, and Cab-O-Sil® TS-610, Cab-O-Sil® TS720 and Cab-O-Sil® TS-622, available from Cabot Corporation.

Carbon black and talc may have primary particle sizes of up to 10 μm, especially at least 15 nm or at least 100 nm to 5 μm, each as measured by laser scattering methods. The bulk density of these materials may be up to 0.5 g/cm$^3$ or up to 0.4 g/cm$^3$. The surface area may be as stated above with regard to the hydrophobically-modified fumed silica. The talc may be hydrophobically modified. Examples of useful carbon black products include those sold by Cabot Corporation as Emperor® 2000, 1800, 1600 and 1200 carbon black. Examples of useful talc products include Talcron® MP 10-52, MP 12-50, MP 15-38 and MP 30-36 from The Cary Company, The emulsion may contain water, provided that water, when present, constitutes no more than 10 percent of the total weight of the emulsion. It has been found that the presence of a small amount of water in the emulsion often makes the emulsion more stable. In some embodiments, the emulsion contains at least 0.25 weight percent or at least 0.5 weight percent water and may contain, for example, up to 5 weight percent or up to 3 weight percent water, based on the total weight of the emulsion.

Some nonionic surfactant products are provided in the form of aqueous solutions or dispersions. In such cases, the weight of the nonionic surfactant excludes the weight of the water in such products, and the weight of water includes that of the water in such surfactant products.

The weight ratio of component ii) of the emulsion to component i) is 0.5 to 10. In some embodiments this ratio is at least 1 or at least 2 and is up to 7 or up to 5. The tackifier by itself may constitute, for example, 10 to 50 percent of the total weight of the emulsion. The polyether polyol component ii) may constitute, for example, 50 to 95 percent of the total weight of the emulsion, especially 65 to 85 percent thereof. The nonionic surfactant (component iii) may constitute, for example, 0.25 to 5 percent of the total amount of the emulsion, especially 1 to 4 percent thereof. The inorganic particulate (i.e., the hydrophobically modified fumed silica, carbon black or talc) constitutes 0.1 to 5 weight percent of the total weight of the emulsion, especially 0.25 to 4 weight percent thereof or 0.5 to 2.5 weight percent thereof.

The emulsion is conveniently prepared by combining the ingredients, in any order, under shear to disperse the tackifier and inorganic particulate into the polyether polyol component ii). The mixing step can be performed using a wide variety of mixing devices including stirrers, static mixers, pin mixers and the like.

The tackifier should be heated above its softening point if it is a room temperature solid. It is often advantageous to heat the tackifier, even when it is a room temperature liquid, to reduce its viscosity and thus facilitate its dispersal into the polyether polyol component ii). The tackifier may be heated, for example, to a temperature of 40 to 100° C., especially 40 to 70° C., prior to forming the emulsion and mixed with the other ingredients while at such a temperature.

The emulsion may include other ingredients in addition to those described above, including one more components of the formulated polyol composition as described more fully below.

Formulated Polyol Composition

The formulated polyol composition of the invention comprises components i)-iv) as described above with regard to the emulsion.

The formulated polyol composition contains v) 0.25 to 5 weight percent water, based on the total weight of the polyol composition. The amount of water may be, for example, at least 0.5 weight percent, at least 1 weight percent or at least 2 weight percent and may be up to 4.5 weight percent or up to 4 weight percent. The foregoing amounts of water include any water present in the emulsion prior to mixing the emulsion with other ingredients of the formulated polyol composition.

The formulated polyol composition further contains vi) at least one urethane catalyst. The urethane catalyst catalyzes either or both of the water-isocyanate reaction and the alcohol-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine) or DMAPA (dimethylaminopropyl amine), or an amine-initiated polyol, acting as an autocatalytic polyol, may also be used to reduce VOC's (volatile organic compounds).

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 4, and the like. Tin carboxylates in which the carboxylate group has 6 to 18 carbon atoms are sometimes associated with lower VOCs in the VE foam. Zinc and tin catalysts are generally used in conjunction with one or more tertiary amine catalysts, if used at all.

Catalysts are typically used in small amounts, each catalyst being employed, for example, in an amount of from about 0.0015 to about 5 percent of the total weight of the formulated polyol composition. Zinc and tin catalysts are generally used in very small amounts within this range, such as from 0.0015 to 0.25 weight percent on the same basis.

The formulated polyol composition further comprises (vii) a foam-stabilizing surfactant. The foam-stabilizing surfactant is a material that helps stabilize the gas bubbles formed by the blowing agent during the foaming process until the polymer has cured. A wide variety of silicone surfactants as are commonly used in making polyurethane foams can be used in the formulated polyol composition of this invention. Examples of such silicone surfactants are commercially available under the trade names Tegostab™ (Evonik Industries AG), Niax™ (Momentive Performance Materials), Dabco™ (Air Products and Chemicals) and VORASURF® (The Dow Chemical Company).

The formulated polyol composition may contain, for example, 0.01 to 5 weight percent of the foam stabilizing surfactant, based on the total weight of the formulated polyol composition. A preferred amount is at least 0.5 weight percent and a preferred upper amount is 2.5 weight percent, on the same basis.

The formulated polyol composition contains 5 to 25 weight percent of component i) (i.e., the tackifier) and 0.1 to 2.5 weight percent of component iv) (i.e., the inorganic particulate), based on the total weight of the formulated polyol composition.

The weight ratio of polyether polyol component ii) to component i) in the formulated polyol composition is 0.5 to 10. In some embodiments this ratio is at least one or at least 2 and is up to 7 or up to 5.

The polyether polyol component ii) may constitute, for example, 25 to 95 percent of the total weight of the formulated polyol composition, especially 50 to 85 percent thereof or 60 to 80 percent thereof. The nonionic surfactant (component iii) may constitute, for example, 0.125 to 5 percent of the total weight of the formulated polyol composition, especially 0.5 to 3 percent thereof.

The formulated polyol composition may include one or more optional ingredients in addition to those described already.

Among the optional ingredients is one or more one or more additional at least difunctional isocyanate-reactive materials, different than component ii). These include, for example, polyol, aminoalcohols and polyamines.

An optional polyol may have an average nominal hydroxyl functionality of 2 to 8, for example, or from 2 to 4. The equivalent weight of such an optional polyol may be, for example, from 30 to 6000.

An optional polyol may be a polyether polyol that has an equivalent weight of 250 to 6000, especially 275 to 2000 or 400 to 1500 and a nominal functionality of 2 or 4, and which contains fewer than 50% oxyethylene units by weight. Such an optional polyether polyol may be a homopolymer of propylene oxide or a random and/or block copolymer of propylene oxide and ethylene oxide. Its oxyethylene content, in the case of a copolymer, may be, for example, at least 5%, at least 10% or at least 15% and may be as high as high as 49%, as high as 35% or as high as 25%, by weight.

Another useful optional polyol is one having an equivalent weight of 30 to 249 and 2 to 6 hydroxyl groups per molecule, and which contains less than 50% by weight oxyethylene units. Among such polyols are propylene glycol, dipropylene glycol, tripropylene glycol, 1,3-propanediol, 1,4-butanediol, 1,5-pentanediol, 1,6-hexanediol, 2-methyl-1,3-propanediol, glycerin, trimethylolpropane, trimethylolethane, pentaerythritol, erythritol, triethanolamine, diethanolamine, mannitol, sucrose, sorbitol and the like, as well as alkoxylates of any of the foregoing that contain less than 50% by weight oxyethylene units.

The formulated polyol composition may contain one or more monoalcohols (monols, i.e., compounds having exactly one hydroxyl group per molecule. Such monols may have hydroxyl numbers, for example, of 10 to 500, especially 25 to 200 or 25 to 75. A monol may be a polyether, such as a homopolymer of propylene oxide, a homopolymer of ethylene oxide, or a random and/or block copolymer of propylene oxide and ethylene oxide.

Other useful optional polyols include, for example, one or more polyester polyols and one or more natural oil polyols such as castor oil, "blown" soybean oil and the like.

The formulated polyol composition may also contain one or more primary or secondary amine compounds such as phenylene diamine, diethyltoluene diamine, ethylene diamine, diethylene triamine, aminated polyethers and the like.

The formulated polyol composition (or any constituent thereof) may contain dispersed polymer particles. The dispersed polymer particles may be, for example, polyurea, polyurethane, and/or polyhydrazide, or a polymer of one or more vinyl monomers. Useful vinyl monomers include, for example, various polyolefins (such as polymers and copolymers of ethylene), various polyesters, various polyamides, various polycarbonates, various polymers and copolymers of acrylic and/or methacrylic esters, a homopolymer or copolymer of styrene, a homopolymer or copolymer of acrylonitrile and the like. In some embodiments, the dispersed particles are styrene-acrylonitrile cop olymer particles.

The dispersed polymer particles in some embodiments have particle sizes from 100 nm to 25 μm, more typically from 250 nm to 10 μm as measured by laser diffraction methods, using equipment such as a Beckman-Coulter LX 13320 laser diffraction particle size analyzer.

The dispersed polymer particles may constitute, for example, at least 1, at least 2 or at least 3 percent of the total weight of the formulated polyol composition and may constitute, for example, up to 60 percent, up to 50%, up to 40%, up to 30%, up to 20% or up to 10% of the total weight thereof.

It may be desirable to include an auxiliary blowing agent in the formulated polyol composition. Such auxiliary blowing agents include physical (endothermic) blowing agents such as various low-boiling chlorofluorocarbons, fluorocarbons, hydrocarbons and the like, as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the formulated polyol composition may contain various other optional ingredients such as cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers, paraffin oil, plant or animal oils or fats, epoxidized vegetable oils and/or animal fats, wax particles, gel particles and the like.

Suitable flame retardants may be solid or liquid. They include, for example, one or more non-halogenated flame retardants and/or one or more halogenated flame retardants. Exemplary flame retardants include melamine or various melamine derivatives, phosphorous compounds that may or may not contain halogens, aluminum-containing compounds that may or may not contain halogens, various nitrogen-containing compounds that may or may not contain halogens, chlorinated compounds, various brominated compounds, expandable graphite, various boron compounds, and polyureas. In some embodiments, the flame retardant is melamine or a melamine derivative and/or one or more halogenated phosphorous compounds.

The formulated polyol composition in some embodiments is an emulsion in which component i) is dispersed in the form of droplets in other liquid components of the formulated polyol composition, and in particular in component ii). Solid components such as component iv) are dispersed in one or more of the liquid phases. The formulated polyol composition in some embodiments is formed by first producing an emulsion as described above, and in the manner described above, which emulsion contains fewer than all of the components of the formulated polyol composition but at least components i)-iv) of the emulsion. In such a case, it is preferred to omit any additional polyol from the pre-formed emulsion, instead combining any such additional polyol with the pre-formed emulsion after it has been produced.

Alternatively, the various ingredients can all be combined at once or in any other arbitrary order, under shear conditions. As before, the tackifier is heated to above its softening point (if a room temperature solid) before combining it with polyether polyol component ii), and even if a room temperature liquid it is preferably heated as before to reduce its viscosity and facilitate mixing with the other ingredients. When made this way, an emulsion of the tackifier in some or all of the other ingredients, notably polyether polyol component ii), tends to form.

Flexible polyurethane foam is made in accordance with the invention by forming a reaction mixture at an isocyanate index of 60 to 125 and reacting the reaction mixture to form the flexible polyurethane foam.

The ingredients of the reaction mixture comprise components i)-vii) as described above, optionally one or more additional at least difunctional isocyanate-reactive materials and at least one organic polyisocyanate. The reaction mixture may contain one or more optional materials as described with regard to the formulated polyol composition.

If desired, all ingredients except the polyisocyanate may be formulated into a formulated polyol composition as described prior to combining with the organic isocyanate to produce the foam. Thus, in some embodiments, a fully formulated polyol composition containing the components i)-vii) and any optional ingredients is brought into contact with the polyisocyanate in a mixhead or other mixing device, there they are combined and dispensed to a location at which reaction and foaming take place. In other embodiments, the emulsion containing only components i)-iv) or only components i)-iv) and water in amounts as described before is brought to the mixhead separately from the, catalyst, foam-stabilizing surfactant and optional ingredients (including additional water if needed) where they are combined all at once with each other and the organic polyisocyanate. In still other embodiments, the emulsion contains one or more ingredients in addition to components i)-iv), and the ingredients not present in the emulsion are brought separately or in various sub-combinations to the mixhead where they are combined all at once with the organic polyisocyanate.

The organic polyisocyanate may have an isocyanate equivalent weight of up to 300, for example. The isocyanate equivalent weight may be up to 250, up to 175, and in some embodiments is 50 to 175. If a mixture of organic polyisocyanates is used, these equivalent weights apply with respect to the mixture; individual organic polyisocyanates in such a mixture may have isocyanate equivalent weights above, within or below those ranges.

Examples of useful organic polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2, 4'-diisocyanate, PMDI, toluene-2,4-diisocyanate, toluene-2, 6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used, in particular a polymeric MDI that contains at most 70% by weight MDI, especially 50 to 70% by weight MDI. Toluene-2,4-diisocyanate, toluene-2,6-diisocyanate and mixtures thereof are generically referred to as TDI, and all can be used.

The foam is formed at an isocyanate index of 60 to 125. "Isocyanate index" is a measure of the amount of organic isocyanate provided to the reaction, being equal to 100 times the ratio of the number of equivalents of isocyanate groups provided by the organic isocyanate to the number of equivalents of isocyanate-reactive groups provided to the reaction mixture. A mole of water is considered as having two equivalents of isocyanate-reactive groups for purposes of this calculation.

The reaction mixture is then foamed and cured. The process of this invention requires no special operating conditions; therefore, processing conditions and equipment described in the art for making flexible polyurethane foam are entirely suitable. In general, the isocyanate compounds will react spontaneously with water and the polyols even at room temperature (22° C.). If necessary, heat can be applied to the reaction mixture to speed the curing reaction. This can be done by heating some or all of the ingredients prior to combining them, by applying heat to the reaction mixture, or some combination of each. Curing is continued until the reaction mixture has expanded and cured sufficiently to form a stable foam.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures. The invention is of particular benefit in a continuous free-rise process, in which the reaction mixture is continuously dispensed into a trough or other reaction zone where it rises and expands. It has been found in such cases that the reaction mixture tends to process easily.

According to an exemplary embodiment, the foam product may be produced under vacuum using variable pressure foaming (VPF) methods.

The flexible polyurethane foam obtained in this process is characterized in some embodiments as having a foam density of 24 to 120 kg/m$^3$, preferably 24 to 80 kg/m$^3$ and more preferably 24 to 64 kg/m$^3$, as measured by ISO 3886.

The flexible polyurethane foam preferably has a resiliency of less than 50%, preferably less than 30%, as measured by ASTM D-3574.

The flexible polyurethane foam may have a glass transition temperature of, for example, −55 to 35° C. In some embodiments, it has a glass transition temperature of at most 20° C. or at most 16° C. The glass transition temperature of the foam can be measured by dynamic mechanical analysis using a solids analyzer such as an RSA-G2 Solids Analyzer from TA Instruments. The glass transition temperature is taken at the peak of the tan delta curve. Suitable test conditions using this device are: cylindrical sample dimensions—10 mm thick, 20 mm diameter; compression mode; frequency 1 Hz; strain 0.1%; preload: 15.0 g; heating rate: 3° C./minute.

The flexible polyurethane foam has a recovery time of, for example at least 0.5 seconds, at least 1 seconds, at least 1.5 seconds, at least 2 seconds, at least 3 seconds, or at least 5 seconds. Recovery time is measured by compressing a foam. A test specimen with a size of 4 in×4 in×2 in (10.16 cm×10.16 cm×5.08 cm), with any skin removed, is compressed to 24% of its initial thickness, and held under compression for 60 seconds. The compressive force is then released and the time required for the foam to re-attain 95% of its original thickness is measured as the recovery time. A suitable apparatus for performing recovery time measurements is a RESIMAT 150 Viscoelastic Foam Testing device (Format Messtechnik GmbH, Germany).

Including the tackifier in the foam formulation has been found to increase the recovery time of the foam relative to an otherwise like foam made without the tackifier. Recovery time may be increased, for example, by at least one second or at least two seconds.

The flexible polyurethane foam may exhibit (after mechanically opening the cells) an airflow of at least 0.24, at least 0.47, at least 0.67, at least 0.95 or at least 1.4 liters/second, measured according to ASTM D-3574. The airflow may be as high as, for example, up to 10, up to 6 or up to 4 liters/second.

The flexible polyurethane foam may meet one or more FR (Flame Resistance) standards, such as British Standard flammability test (BS 5852—ignition source 5) using a wooden assembly (referred to as a crib) as a source of ignition.

It is believed that the increase in recovery time is due to the tackifier forming a continuous or discontinuous tacky layer on the interior surfaces of the foam. In some embodiments, the tackifier forms discontinuous regions or "islands" on internal surfaces of the foam. These islands may have, longest dimensions of, for example, 10 nm to 200 am and may occupy, for example, at least 1%, at least 2.5% or at least 5% up to 75%, up to 50%, up to 40%, up to 33% or up to 25% of the interior surface area of the foam. When the foam is compressed, internal surfaces come into contact; the tackiness imparted by the tackifier causes the contacting internal surfaces to adhere together temporarily until overcome by the elastic recovery of the foam. The temporary adhesion is believed to cause the increase in recovery time.

The presence of tackifier on the internal surfaces of the polyurethane foam can be ascertained using microscopic methods having the appropriate resolution. Scanning electron microscopy is suitable to visualize the regions occupied by the tackifier. Methods such as energy-dispersive X-ray spectroscopy (EDS) are useful to surface assign regions to the tackifier and the foam, respectively, due to chemical differences between the tackifier and foam.

External surfaces of the foam of the invention also tend to be tacky. For this reason, it is desired to keep the foam of the invention and the human body be separated by at least a fabric, or one or more of another type of foam, or both. It can also be desirable to treat the foam to reduce surface tack.

A useful method of treating the foam is to apply an aqueous dispersion or emulsion of a silicone or wax to the foam, and then to cure the applied dispersion or emulsion. "Curing" as used herein with regard to the silicone or wax dispersion denotes a solidification step in which the liquid phase of the dispersion is removed, leaving a silicone or wax coating behind. In addition, the curing step may include one or more chemical reactions such as crosslinking or chain extension, depending on the nature of the particular dispersed material.

The silicone in such a dispersion or emulsion may be an aminosilicone. Such an aminosilicone may have the structure:

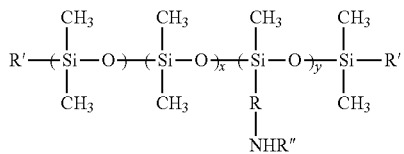

wherein each R' is independently alkyl (especially methyl), phenyl, alkoxyl, hydroxyl, amino or R-NHR", each R is independently a covalent bond, an alkyl group or a alkylene polyalkyleneamine group, each R" is hydrogen, alkyl (especially $C_{1-4}$ alkyl) or phenyl, and each x and each y is a positive number. x may be, for example, from 25 to 500 or from 50 to 150 and y may be, for example, 1 to 50 or 3 to 20. In some embodiments, each R is selected from ethylene, isopropylene, n-propylene and —$C_3H_6$—NH—$C_3H_6$—.

Suitable silicone dispersions include products that find use as textile finishes and/or softeners. Examples include Synthasil SW 216, Synthasil 5240, Synthasil S 125 Synthasil MF 5, Synthasil SME, Synthasil PPS 2, Synthasil SW 28 30, Synthasil SE LF, Synthasil LAN C, Synthasil LAN 40, Synthasil SW 34, Synthasil 34, Synthasil HAN 30, Synthasil SW 1820, Synthasil SE 100, Synthasil SIB and Synthasil EPL silicone emulsions, all from Piedmont Chemical; Xiameter® organofunctional silicone emulsions from The Dow Chemical Company; and Formasil® silicone additives from Momentive Performance Products.

The treatment is applied by contacting the dispersion or emulsion to one or more external surfaces of the foam. The amount of dispersion or emulsion is preferably sufficient to provide 20 g to 300 g of silicone or wax (on a solids basis, i.e., after removal of the liquid phase) per square meter of foam surface area.

Because the foam is open-celled, the applied dispersion or emulsion wicks into the foam and therefore penetrates into the surface and into the foam. The presence of oxyethylene units in the foam is also believed to contribute to this wicking. To facilitate this wicking, any external skin should be removed from the foam surface(s) to which the dispersion or emulsion is applied.

The low coating weight prevents the dispersion or emulsion from penetrating throughout the entire mass of the foam. As a result of the wicking and partial penetration of the dispersion of emulsion into the foam, only a portion of the internal surfaces of the foam becomes coated. As a result, the coated foam, after curing, has a non-tacky surface. Internal surfaces of the foam, however, remain uncoated and tacky. The tackiness of these uncoated internal surfaces is believed to account for the prolonged recovery times, despite the non-tacky surfaces.

Because the coating weight is low and the dispersion or emulsion wicks into the foam, the cured coating does not cause or form any significant skin on the foam surface, nor does it plug cells. Because of this, airflow through the foam is at most slightly affected by the application of the coating.

Curing is generally performed at an elevated temperature, such as 40 to 100° C. for a period of 1 to 120 minutes, and/or by application of infrared energy. The elevated temperature may take place at least partially due to the reaction exotherm that is released to the foam formulation.

The foam of the invention is useful in cushioning applications such as pillows, mattresses, backrests (for bed headboards, seating, etc.), automotive arm rests, seat cushions for home and/or vehicular seating, packaging, protective cushioning, and the like. It can be used as, or as a component of, sound and/or vibration (i.e., NVH) damping measures. For example, it is useful in acoustic applications to reduce noise, vibration and/or harshness, for earplugs, as well as other applications in which previous slow-recovering polyurethane foams are useful. It is useful in other applications where slow recovery after foam compression is wanted. In general, the slow-recovering foam of the invention can be used in the same applications and in the same manner as conventionally-produced slow-recovering foam.

The following examples are provided to illustrate the invention, but are not intended to limit the scope thereof. All parts and percentages are by weight unless otherwise indicated. All molecular weights are number averages by gel permeation chromatography.

In the following examples:

Polyol A is a 4500 number average molecular weight, nominally trifunctional random copolymer of about 75% ethylene oxide and 25% propylene oxide.

Polyol B is a 3100 number average molecular weight, nominally trifunctional random copolymer of 11% ethylene oxide and 89% propylene oxide.

TDI-80 is a mixture of 80% 2,4-toluene diisocyanate and 20% 2,6-toluene diisocyanate.

The Nonionic Surfactant is a block copolymer made by polymerizing about 40 moles of ethylene oxide onto a 200 molecular weight polypropylene oxide) monol. It is sold commercially as TERGITOL™ 15-S-40 by The Dow Chemical Company. Its HLB is approximately 18.

Fumed Silica A is a hydrophobic fumed silica having a surface area of 150-190 $m^2/g$, a pH value of 3.4-5.0 and a carbon content of 0.9-1.5 weight percent. It is sold by Evonik Industries as Aerosil® R974.

Fumed Silica B is a hydrophobic fumed silica surface modified with dimethyldichlorosilane, sold by Cabot Corporation as Cab-O-Sil® TS-622.

The Foam Surfactant is an organosilicone foam stabilizing surfactant sold by Evonik Industries as Tegostab® B-8040.

The Catalyst is a mixture of bis(2-dimethylaminoethyl) ether, triethylene diamine and stannous octoate.

The Tackifier is a polyterpene resin sold by Kraton Corporation as Sylvares® TR A25L. This material has a softening point of 26° C. as measured by Kraton test method AQCM 003, a glass transition temperature of −20° C. as measured by Kraton test method AQCM 218 and a viscosity of 4450 cps at 50° C. as measured by Kraton test method AQCM 004.

EXAMPLES 1-4 AND COMPARATIVE SAMPLE A

A. Preparation of Emulsions

Emulsion Example E-1 through E-4 are prepared by mixing the ingredients indicated in Table 1 in a high speed laboratory mixer. All ingredients are initially at room temperature except the Tackifier, which is preheated to 50° C. prior to being combined with the other ingredients.

TABLE 1

| | Parts by Weight | | | |
|---|---|---|---|---|
| Ingredient | E-1 | E-2 | E-3 | E-4 |
| Polyol A | 20 | 50 | 20 | 50 |
| Tackifier | 10 | 10 | 10 | 10 |
| Nonionic Surfactant | 1 | 1 | 1 | 1 |
| Fumed Silica A | 0.5 | 0.5 | 0 | 0 |
| Fumed Silica B | 0 | 0 | 0.5 | 0.5 |

In each case, a stable emulsion of the tackifier in Polyol A is obtained. By contrast, when otherwise like emulsions are prepared, substituting Polyol B for Polyol A, a gelled material unsuitable for processing through a polyurethane foam equipment is obtained.

Flexible polyurethane foam Examples 1-4 are made with Emulsions E-1 through E-4, respectively. The foam formulations are as indicated in Table 2 below. In each case the foams are made in each case by mixing all components except the Catalyst and TDI-80 in a high-speed mixer at room temperature for 15 seconds at 2400 rpm. The Catalyst is added and mixed in for 15 seconds at 2400 rpm. The TDI-80 is then mixed in for 3 seconds at 3000 rpm, and the reaction mixture is immediately poured into a 38 cm×38 cm×24 cm box lined with a plastic release film. The foam is permitted to rise and set in the box and is then cured overnight at room temperature. The external surfaces of the foam are removed to expose open cells on all external surfaces.

Comparative Foam A is made in the same way from the ingredients indicated in Table 2. Comparative Foam A contains no tackifier.

TABLE 2

| | Parts by Weight | | | | |
|---|---|---|---|---|---|
| Ingredient | Comp. A* | 1 | 2 | 3 | 4 |
| Polyol A | 75 | 45 | 0 | 45 | 0 |
| Polyol B | 25 | 25 | 25 | 25 | 25 |
| Emulsion E-1 | 0 | 47.25 | 0 | 0 | 0 |
| Emulsion E-2 | 0 | 0 | 92.25 | 0 | 0 |
| Emulsion E-3 | 0 | 0 | 0 | 47.25 | 0 |
| Emulsion E-4 | 0 | 0 | 0 | 0 | 92.25 |
| Water | 3.8 | 3.8 | 3.8 | 3.8 | 3.8 |
| Foam Surfactant | 2 | 2 | 2 | 2 | 2 |
| Catalyst | 0.55 | 0.50 | 0.50 | 0.50 | 0.50 |
| TDI-80 (100.5 index) | 43.38 | 43.45 | 43.45 | 43.45 | 43.45 |
| Total Tackifier Content | 0 | 15 | 15 | 15 | 15 |
| Total Polyol A Content | 75 | 75 | 75 | 75 | 75 |

*Not an example of this invention.

In each of Examples 1-4, the Emulsion blends easily with the other components to form a macroscopically uniform mixture. The foams in each case rise and cure rapidly. These characteristics indicate that these examples are readily scaled to continuous, large-scale production.

Foam Density, indentation force deflection (IFD), compression set, tensile strength, tear strength, elongation, airflow and resiliency are measured for each foam according to ASTM D3574. Recovery time is measured in each case in the manner described above. Results are as indicated in Table 3.

TABLE 3

| | Result | | | | |
|---|---|---|---|---|---|
| Property | Comp. A* | Ex. 1 | Ex. 2 | Ex. 3 | Ex. 4 |
| Density, pcf (kg/m$^3$) | 1.71 (27.4) | 1.94 (31.1) | 1.96 (31.4) | 1.95 (31.2) | 1.96 (31.4) |
| Resilience, % | 39 | 28 | 28 | 29 | 28 |
| Recovery time, sec. | 0 | 2.8 | 4.6 | 2.9 | 2.8 |
| Airflow, scfm (L/s) | 4.2 (2.0) | 6.4 (3.0) | 4.6 (2.2) | 5.4 (2.55) | 4.5 (2.1) |
| Tensile Strength, psi (kPa) | 8.7 (60.0) | 10.4 (71.7) | 8.2 (56.5) | 10.9 (75.2) | 10.2 (70.3) |
| Tear Strength, pli (N/mm) | 2.33 (0.41) | 2.44 (0.43) | 2.59 (0.45) | 2.47 (0.43) | 2.47 (0.43) |
| Elongation to break, % | 163 | 257 | 100 | 262 | 233 |
| IFD, lb-force (N) | | | | | |

TABLE 3-continued

| | Result | | | | |
|---|---|---|---|---|---|
| Property | Comp. A* | Ex. 1 | Ex. 2 | Ex. 3 | Ex. 4 |
| 25% Compression | 29 (129) | 9 (40) | 11 (49) | 10 (44) | 12 (53) |
| 65% Compression | 54 (289) | 20 (89) | 22 (98) | 21 (93) | 24 (107) |
| 90% Compression Set, % | 3 | 7 | 8 | 5 | 5 |

*Not an example of this invention.

As can be seen from the data in Table 3, good foams are made with the invention. The foam properties obtained are representative of good quality cushioning foams. Comp. Sample A has poor viscoelastic properties. Resilience is almost 40% and recovery time is zero. Those attributes are indicative of a resilient foam that springs back immediately after a compressive force is removed. By contrast, each of Examples 1-4 has a resiliency of below 30 and recovery times that range from almost 3 seconds to almost 5 seconds.

Scanning electron micrographs are obtained on samples taken from each of Examples 1 and 2. The micrographs appear as FIGS. 1 and 2, respectively.

Turning to FIG. 1, strut 1 is single strut of a polyurethane-urea foam. Islands 2 are islands tackifier that together occupy a portion of the exterior surface of strut 1. Tackifier islands 2 range in size from a few micrometers to 20-30 micrometers and occupy 5 to 10% of the surface area of strut 1. Tackifier islands 2 are richer in carbon than strut 1, and relatively deficient in both carbon and nitrogen (which is not detectable at all in islands 2 and 2A), upon examination using energy-dispersive X-ray spectroscopy (EDS). These EDS results permit polyurethane or polyurethane-urea to be assigned as the material of construction of strut 1 and tackifier to be assigned as the component of islands 2. The relatively low level of oxygen in islands 2 is consistent with the low oxygen content of the tackifier relative to the raw materials that react to form the polyurethane. In addition, the lack of nitrogen in islands 2 confirms that urethane and urea linkages are absent, which eliminates islands 2 from being polyurethane.

Figure 2:
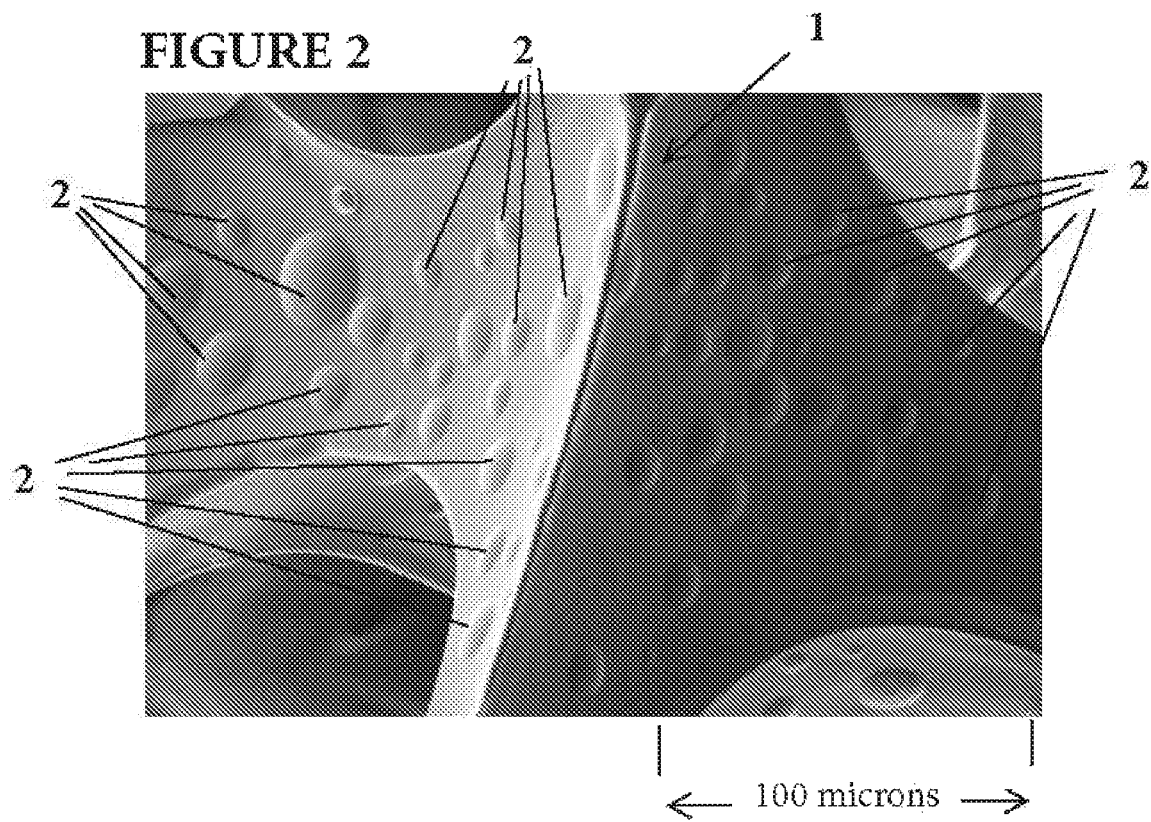
FIG. 2 is a scanning electron micrograph of a foam made in accordance with Example 2.

The reference numerals in FIG. 2 indicate the same features as the corresponding numerals in FIG. 1. In the embodiment depicted in FIG. 2, tackifer islands 2 have sizes of about 5 to 30 μm and occupy 15-40% of the surface area of strut 1. As is the case for FIG. 1, islands 2 are identified as tackifier due to the low level of oxygen and absence of nitrogen as determined by EDS.

EXAMPLES 5-10 AND COMPARATIVE SAMPLES B and C

Emulsion Examples 5-10 and Comparative Samples B and C are made by combining 10 parts of a polyterpene resin (Piccolyte® A25 from Pinova Solutions, softening temperature 22-28° C., Brookfield viscosity 3500-5500 cps at 50° C.), 1 part of nonionic surfactant (when used) and 0.5 part of an inorganic particulate (when used) as indicated in Table 4 below. These components are heated to about 50° C. to soften the polyterpene resin, hand-mixed until visually homogeneous and reheated to 50° C. 30 parts of Polyol A are added, and the mixture in each case is transferred to a laboratory benchtop mixer and stirred at high speed to form an emulsion.

The nonionic surfactant is an ethylene oxide/propylene oxide block copolymer with an HLB of approximately 18 as described before. As in indicated in Table 4, the nonionic surfactant is provided neat (as a room temperature solid) in some cases and as a liquid solution of 70% surfactant and 30% water in others. In the latter case, the amount of surfactant is about 0.7 parts and the amount of water is 0.3 parts.

The inorganic particulate is Fumed Silica A as indicated above, Emperor™ 1600 carbon black from Cabot Corporation, or Talcron MP 10-52 talc from The Cary Company, as indicated in Table 4.

The emulsions so produced are maintained at room temperature and observed periodically to evaluate their stability. The time until the emulsion has fully separated to form a two-phase system is indicated in Table 4 as a measure of emulsion stability (with greater times indicating better stability). After phase separation has taken place, re-emulsification is attempted by again stirring the mixture at high speed on the laboratory benchtop mixer. Results of the re-emulsification attempts are as indicated in Table 4.

TABLE 4

| Sample | Inorganic Particles/ Nonionic Surfactant | Days to Phase Separation | Able to Be Re-Emulsified? |
|---|---|---|---|
| B* | Fumed silica/no surfactant | <5 | No |
| C* | No particles/neat surfactant | <5 | No |
| 5 | Fumed silica/neat surfactant | 14 | Yes |
| 6 | Fumed silica/aqueous surfactant solution | >21 | Yes |
| 7 | Carbon black/neat surfactant solution | 10 | Yes |
| 8 | Carbon black/aqueous surfactant solution | 14 | Yes |
| 9 | Talc/neat surfactant | 14 | Yes |
| 10 | Talc/aqueous surfactant solution | >21 | Yes |

*Not an example of the invention.

Comparative Samples B and C demonstrate the need to have both the inorganic particles and nonionic surfactant present in order to obtain adequate emulsion stability. In each case the emulsion phase separates after a short period and cannot be re-emulsified.

Each of Examples 5-10 demonstrates improved emulsion stability (and ability to re-emulsify) when both surfactant and inorganic particles are present. Emulsion stability is at least doubled in each case. The presence of water in Examples 6, 8 and 10 provides still further increases in emulsion stability, as seen by comparing those Examples with Examples 5, 7 and 9, respectively.

What is claimed is:
1. A formulated polyol composition comprising:
  i) at least one tackifier;
  ii) at least one polyether polyol having an oxyethylene content of at least 50% by weight;
  iii) at least one nonionic surfactant having a hydrophilic-lipophilic balance of 12 to 19;

iv) at least one hydrophobically-modified fumed silica, carbon black, talc, or a mixture of any two or more thereof;
v) 0.25 to 5 weight percent water, based on the total weight of the formulated polyol composition;
vi) at least one urethane catalyst; and
vii) at least one foam-stabilizing surfactant,
wherein the formulated polyol composition contains 5 to 25 weight percent of component i) and 0.1 to 2.5 weight percent of component iv), based on the total weight of the formulated polyol composition, and the weight ratio of component ii) to component i) is 0.5 to 10.

2. A method of making a flexible polyurethane foam, comprising
I) forming a reaction mixture, at an isocyanate index of 60 to 125, the reaction mixture comprising:
i) at least one organic polyisocyanate;
ii) at least one tackifier;
iii) at least one polyether polyol having an oxyethylene content of at least 50% by weight;
iv) at least one nonionic surfactant having a hydrophilic-lipophilic balance of 12 to 19;
v) at least one hydrophobically-modified fumed silica, carbon black, talc, or a mixture of any two or more thereof;
vi) 0.25 to 5 weight percent water, based on the total weight of all components of the reaction mixture except the at least one organic polyisocyanate;
vii) at least one urethane catalyst; and
vii) viii) at least one foam-stabilizing surfactant,
wherein the reaction mixture contains 5 to 25 weight percent of component ii) and 0.1 to 2.5 weight percent of component v) based on the total weight of all components except the at least one organic polyisocyanate(s), and the weight ratio of component iii) to component ii) is 0.5 to 10; and
II) reacting the reaction mixture to form the flexible polyurethane foam.

3. The method of claim 2 wherein the at least one tackifier is one or more of a rosin, a hydrogenated and/or esterified rosin, a polyterpene, a C5 aliphatic resin, a C9 aromatic resin, a C5/C9 copolymer resin, a hydrogenated C5 or C9 resin, a polybutene, an epoxy resin, a styrene/butadiene copolymer, an ethylene-acrylic acid copolymer, an ethylene-propylene copolymer having a density of less than 0.900 g/cc, a silicone oil, xanthan gum, ethyl cellulose, hydroxylpropyl methyl cellulose, carboxylmethyl cellulose, cationic polyacrylamide, para-t-octyl phenol formaldehyde resin, a polyester having a molecular weight of 800 to 2000, a urethane acrylate oligomer, or a room temperature liquid ethylene-propylene-diene resin.

4. The method of claim 2 wherein the at least one nonionic surfactant is one or more of a block copolymer of ethylene oxide and a higher alkylene oxide, or an ethoxylated hydrocarbon in which the hydrocarbon portion includes a linear, branched, aliphatic, cycloaliphatic and/or aromatic group having at least 6 carbon atoms.

5. The method of claim 2 wherein component v) is at least one fumed silica which has been hydrophobically modified by reaction at its surface with one or more hydrocarbon, halogen-substituted hydrocarbon, siloxane and/or silane groups.

6. The method of claim 2 wherein component v) has a surface area of at least 90 $m^2/g$ as measured by nitrogen absorption methods.

7. A flexible polyurethane foam made by the process of claim 2.

8. The flexible polyurethane foam of claim 7 wherein the at least one tackifier occupies 2.5 to 40% of the surface area of internal surfaces of the polyurethane foam.

9. The flexible polyurethane foam of claim 7 wherein the at least one tackifier is present on internal surfaces of the polyurethane foam in the form of discontinuous regions having longest dimensions of 10 nm to 200 μm.

* * * * *